United States Patent [19]
Bennett et al.

[11] Patent Number: 5,177,866
[45] Date of Patent: Jan. 12, 1993

[54] METHOD OF ASSEMBLING A VALVE SYSTEM DURING COMPOSITE MOLDING PROCESS

[75] Inventors: Michael D. Bennett, Westland; Todd A. Gross, Dearborn Heights; Thomas D. Wernholm, Northville, all of Mich.

[73] Assignee: Ford Motor Company, Dearborn, Mich.

[21] Appl. No.: 753,274

[22] Filed: Aug. 30, 1991

[51] Int. Cl.⁵ .............................................. B23P 17/00
[52] U.S. Cl. ........................... 29/890.127; 29/890.124; 29/424; 29/434; 29/527.2; 264/242
[58] Field of Search ............... 29/890.124, 890.127, 29/434, 424, 458, 527.2; 264/221, 241, 242, 264, 328.14; 137/375

[56] References Cited

U.S. PATENT DOCUMENTS

| | | | |
|---|---|---|---|
| 2,066,658 | 1/1937 | Street | 29/890.127 |
| 2,829,411 | 4/1958 | D'Angelo | 164/90 |
| 2,954,992 | 10/1960 | Baker | 403/140 |
| 3,193,914 | 4/1965 | Killian | 29/890.122 |
| 3,224,045 | 12/1965 | Hodge et al. | 425/3 |
| 3,537,683 | 11/1970 | Snell, Jr. | 251/306 |
| 3,675,888 | 7/1972 | Scaramucci | 249/57 |
| 3,786,543 | 1/1974 | Sato | 20/424 X |
| 3,882,220 | 5/1975 | Ryder | 264/221 |
| 3,940,108 | 2/1976 | Edwards | 256/306 |
| 3,959,872 | 6/1976 | Abe | 29/424 X |
| 4,017,961 | 4/1977 | Kochte et al. | 29/450 |
| 4,604,254 | 8/1986 | Yamamoto et al. | 264/242 X |
| 4,740,347 | 4/1988 | Sloan, Jr. et al. | 29/890.127 |
| 4,774,750 | 10/1988 | Platusich | 29/890.127 |
| 4,840,675 | 6/1989 | Fukui et al. | 264/264 X |
| 5,096,643 | 3/1992 | Kowanz et al. | 264/264 X |

Primary Examiner—Mark Rosenbaum
Assistant Examiner—S. Thomas Hughes
Attorney, Agent, or Firm—Jerome R. Drouillard; Roger L. May

[57] ABSTRACT

A method of integrating a valve system with a to be molded component part, such as a throttle valve assembly and a throttle body or air horn, consisting of: first, assembling or manufacturing the throttle valve assembly; second, coating or completely lining the valve assembly with a meltable core material; third, placing the lined valve assembly in place in a die of the throttle body or air horn to be molded; fourth, removing the molded throttle body with valve assembly integral therewith; and finally, heating the meltable core material between the throttle valve assembly and air horn to melt it and remove it therefrom to provide the desired clearance space between, permitting relative rotation between the two.

8 Claims, 1 Drawing Sheet

METHOD OF ASSEMBLING A VALVE SYSTEM DURING COMPOSITE MOLDING PROCESS

FIELD OF THE INVENTION

This invention relates in general to the engine of an automotive type motor vehicle. More particularly, it relates to a method of integrating a valve system, such as an assembly of a throttle valve and shaft, by molding in place during the composite molding of a component part, such as, for example, the air horn or throttle body with which the valve cooperates.

BACKGROUND OF THE INVENTION

In general, engine throttle valves are assembled or manufactured to a shaft and then assembled to the air horn portion of the engine, with clearance between the two so that the valve can rotate as designed in the air horn passage to control the air flow therethrough. The assembly process, however, is often cumbersome and difficult because of the inaccessibility and/or lack of space within the air horn or throttle body to make connections for fixing the throttle shaft assembly therein. This is especially so when attempting to provide the correct clearances between the various components.

This invention relates to assembling or manufacturing a valve system in place during the composite molding of a component part, such as the air horn throttle body; with, however, the additional step of precoating the valve assembly with a meltable core material, so that after the molding process, the core material can be melted out to provide the desired clearance space between the valve system and the component part, permitting relative rotation therebetween.

Stated another way, after assembly or manufacture of the valve plates to the valve shaft, a meltable liner encompassing the latter valve system is molded around it prior to the composite molding of the part with which it cooperates.

The prior art fails to show such a method as is proposed. Those related devices that are known do provide molding in place of elastomeric type members as a part of a valve system. However, they are generally used as insulators or valve seats and are not meltable and definitely not meant to be removed, as that would destroy their function.

DESCRIPTION OF THE PRIOR ART

U.S. Pat. No. 4,774,750 to Platusich shows a butterfly type valve housing 2 in which the trunnions 13 and 14, on which the butterfly valve 3 is pivoted, are movable in a metallic core body 22 that is completely encased by an injection molded synthetic elastic covering body 23. There is no melting or eliminating of the covering body, which is used as a protective shield against deterioration of the metallic movable parts by the liquid conveyed to conduits 6 and 7.

U.S. Pat. No. 3,675,888 to Scaramucci describes a molding process in which an elastomeric valve seat 92 is molded in a valve body 52 with the valve member 74 and stem 78 and 86 already in place. Also, the molding is done in such a manner that the inner periphery of the seat is uniformly maintained with respect to the valve member. The elastomeric seat member 92 is bonded to the walls of the bore of the valve body. A space is provided between the valve body and valve corresponding to the volumetric area to be occupied by the elastomeric seat 92. Uncured elastomeric material has been injected into space 126 and later cured to form the valve seat. The valve body, valve and seal then combine to form a unitary structure. However, there is no melting or removal of the elastomeric seat.

U.S. Pat. No. 3,537,683 to Snell, Jr. shows a valve seat for a butterfly valve that is elastomeric. It includes a reinforcing member that is molded in place in the valve seat when the mold cavity is filled with elastomeric material.

U.S. Pat. No. 2,954,992 to Baker merely shows a tie rod, ball and socket construction in which a moldable non-metallic material, such as nylon, is injected in place between the ball and its socket to embrace the ball and provide a better bearing surface.

U.S. Pat. No. 2,066,658 to Street, U.S. Pat. No. 3,193,914 to Killian, and U.S. Pat. No. 3,940,108 to Edwards, all are similar in describing elastomeric members that are molded with the valves or valve body to provide valve seats or similar parts, similar to that described by Scaramucci and Snell, Jr., above.

U.S. Pat. No. 3,224,045 to Hodge et al. relates to the molding of an electromagnetic carrier, and more particularly, molding the body of the contact carrier assembly with the armature in place in the mold to form an integral assembly.

U.S. Pat. No. 4,017,961 to Kochte et al. relates to the molding of a holder 11 for an operating rod 12. The holder is molded around a core rod 27 with a drag ring 18 that becomes compressed and therefore exerts a drag on rod 12 when it is inserted into the holder to prevent rattling and displacement.

U.S. Pat. NO. 2,829,411 to D'Angelo is another illustration of the casting of a part around an inserted shaft to form a rotatable assembly.

SUMMARY OF THE INVENTION

From the above, it will be clear that none of the prior art described shows or even mentions the use of a meltable coring material that captures or encompasses the core body of an assembly to be molded in place during composite molding of a component part so that thereafter upon melting of the core material a clearance space between the two will be provided permitting relative rotation therebetween in a desired manner.

It is a primary object of the invention, therefore, to provide a method of integrating a valve system to a component part by composite molding the two together after a meltable core material has been molded around the valve assembly, the core material being of a configuration and thickness ultimately providing a design clearance space between the valve assembly and component part upon melting of the core material.

Another object of the invention is to provide a method of integrating a throttle valve system to an air throttle body assembly by first manufacturing or assembling the valve system as a unit; secondly, molding a meltable liner around the entire valve assembly of a predetermined thickness and configuration; thirdly, molding the valve assembly with liner with the component part; and finally, removing the integral structure from the mold and subsequently heating the structure to melt and remove the meltable core material leaving a predetermined clearance space between the valve assembly and throttle body to provide for the relative rotation between the two.

BRIEF DESCRIPTION OF THE DRAWINGS

Other objects, features and advantages of the invention will become more apparent upon reference to the succeeding, detailed description thereof, and to the drawings illustrating the preferred embodiment thereof, wherein.

DESCRIPTION OF THE PREFERRED EMBODIMENT

As stated previously, the invention relates to a method of molding several cooperating parts together to form an integral structure; preconditioned, however, prior to the molding process, by precoating a meltable liner around one of the components, the liner being subsequently melted out of the integrated structure after the molding process to provide a clearance space between the units joined.

Figure 1:
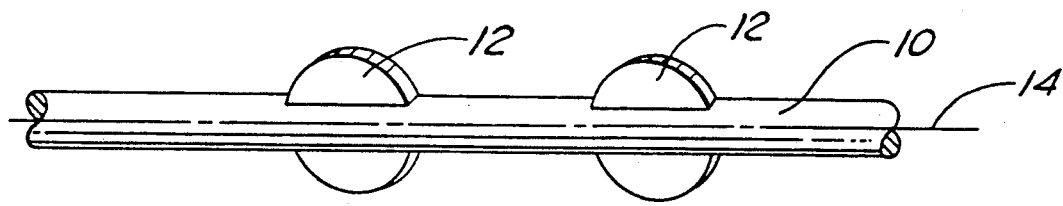
FIG. 1 is a schematic illustration of a valve system.

In this case, the units to be joined can be, for example, a metal automotive type throttle valve assembly or a composite material air horn or throttle body. More particularly, FIG. 1 shows the first step in the process. A throttle valve shaft 10 has assembled to it two butterfly type throttle valves 12 that are axially spaced from one another and extend transversely from the axis 14 of the throttle shaft. The throttle valves and shaft could be cast as an integral unit or the valves 12 screwed to flats on the shaft 10, as a matter of choice.

Figure 2:
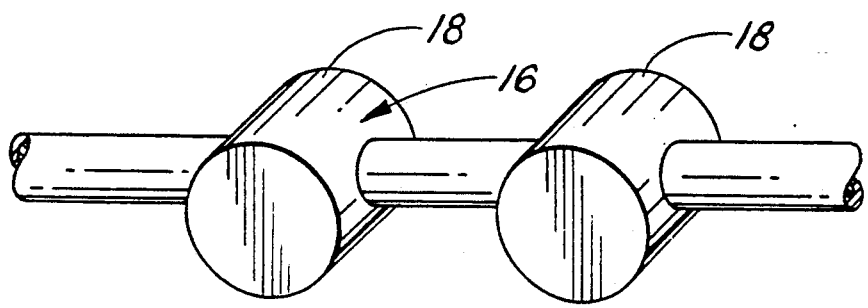
FIG. 2 schematically illustrates a coating molded around the valve assembly of FIG. 1.
Figure 3:
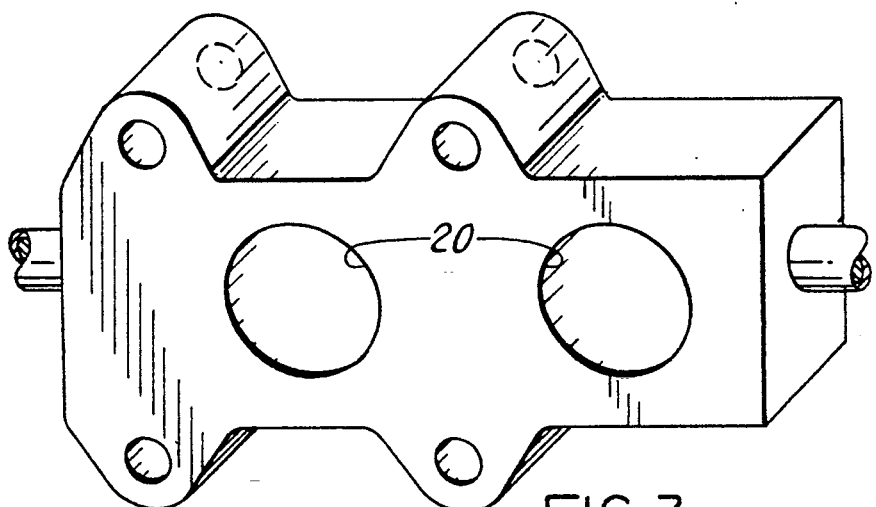
FIG. 3 schematically illustrates capturing the molded assembly of FIG. 2 in a mold of a component part.

FIG. 2 illustrates the second step in the Process or method of integrating the throttle valve assembly to the throttle body. More particularly, a meltable core material 16 is molded around the assembly of FIG. 1 to totally encompass the same, and the configuration is such as to define a plurality of hollow, cylindrical or barrel-like bodies 18 that envelope each of the butterfly valve plates 12. The internal diameter of each of the cylinders defines the path of movement generated by rotation of the throttle valves 12, 90° from the position shown in FIG. 1, for example. The external diameter of cylinders 18 defines each throttle body mating passageway 20 that will exist after the injection molding process, for example, produces the throttle body or air horn. The valves 12 are adapted to cooperate with the molded throttle body in the known manner by rotating within the same between an open position and one essentially blocking the flow passage through the throttle body.

The meltable core material 16 described in connection with FIG. 2 would be of a predetermined thickness or a diameter only slightly larger than the outside diameter of the valves. This will provide the specified clearance necessary between the throttle valve assembly and the air horn or throttle body within which it will be nested so that the shaft and throttle valves can turn or rotate in the desired manner to function in a known manner.

The third step in the integration process is to place the coated or lined valve assembly of FIG. 2 into the mold of the air horn or throttle body for injection molding, for example, of the same with the valve assembly in place. The injection molding process then is completed and the integrated throttle valve assembly and air horn structure extracted, with the meltable core material between the throttle valve assembly and air horn still intact.

The final step of the process or method then is to subject the finished integrated structure to heat sufficient to melt the meltable core material and remove it from the space between the two components, thereby providing a predetermined thickness clearance space permitting relative rotation therebetween.

Figure 4:
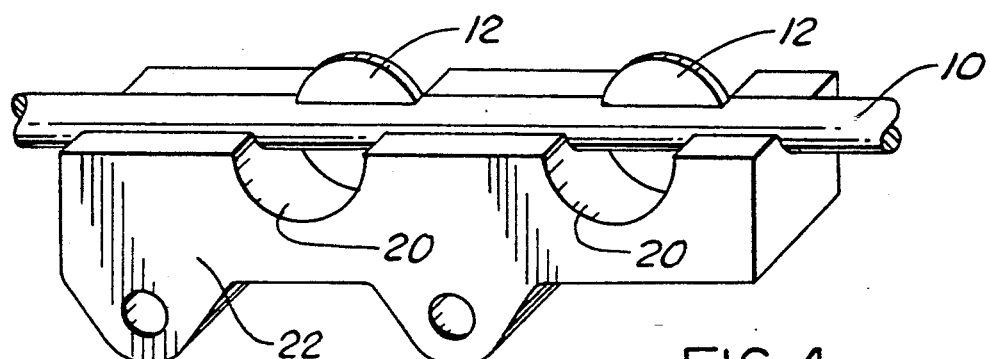
FIG. 4 is a cutaway perspective view of a portion of the molded integrated structure embodying the invention.

FIG. 4 is a cutaway showing the finished, integrated structure with the valve system in place and the unit ready for service.

As described above, the valve assembly is coated, or lined, with a meltable core material. In the event that not all of the material is removed upon melting, then the valve assembly can be precoated with a less wet material that will assure complete extraction of the meltable core material upon melting of the same after the injection molding process.

From the above, it will be clear that the invention provides a method of integrating elements or components by molding them together with a coating of meltable core material between that can be removed by heating after the injection molding process is completed, providing a finished product with a design clearance between the elements. Moreover, those skilled in the art will appreciate in view of this disclosure that a process according to the present invention could be practiced not only by thermal melting of the coating material, but also by solvent removal or yet other processes suggested by this disclosure.

While the invention has been shown and described in its preferred embodiment, it will be clear to those skilled in the art to which it pertains that many changes and modifications may be made thereto without departing from the scope of the invention.

We claim:

1. A method of integrating a throttle valve assembly with a throttle body part, such that a predetermined clearance is established therebetween, comprising the steps of:

first, developing a core body consisting of a throttle shaft with a butterfly type valve fixed thereto and extending transverse thereto;

second, molding a meltable covering over the core body with said covering having a thickness corresponding to the desired pre-determined clearance between said throttle shaft and said throttle body part;

third, molding the covered core body and a component throttle body part together to form an integral unit; and fourth, removing the unit from the mold and treating the assembly to melt and remove the covering, thereby providing said pre-determined clearance between the throttle shaft and butterfly of the core body and throttle body part permitting relative movement therebetween.

2. A method of integrating a throttle valve assembly with an air horn throttle body part comprising the steps of:

first developing a core body adapted to be movable within a component part and consisting of a throttle valve shaft with at least one butterfly type throttle valve fixed thereon and extending transverse thereto;

second, capturing the core body in a meltable core to envelope the body with a protective liner having an outer shape generated by the paths of movement of the core body with said liner having a thickness corresponding to a final clearance between said throttle shaft and said throttle body part;

third, placing the covered core body in a mold die of the throttle body with which ti is to cooperate and rotate therein subsequent to being joined together as an integral assembly and molding the core body and throttle body together; and fourth, removing the integral assembly from the mold and heating the integral assembly to melt and remove the liner from the core body to provide the final clearance space between the throttle shaft and butterfly valve of the core body and the throttle body permitting relative rotation therebetween.

3. A method as in claim 2, wherein the core body includes a plurality of axially separated throttle valves.

4. A method as in claim 2, wherein the liner includes a cylindrical outer periphery covering the throttle valve of sufficient length allowing complete rotation of the valve within the confines of the periphery and defining the mating flow passages through the throttle body.

5. A method as in claim 2, wherein the liner includes a hollow barrel-like portion covering the valve and defining a cylindrical passage within which the valve can rotate.

6. A method as in claim 2, wherein the liner is of a thickness providing a uniform clearance space between the core body and throttle body subsequent to melting of the meltable core.

7. A method as in claim 5, wherein the throttle body comprises an air horn body having cylindrical air passages therethrough subsequent to the molding of the air horn and core body together for cooperation with the cylindrical outer periphery defined by the liner.

8. A method as in claim 5, wherein the outside diameter of the liner is only slightly greater than the outside diameter of the valve to permit rotation of the valve to open passage positions within the throttle body subsequent to melting of the liner from the core body while permitting rotation of the valve to a position essentially blocking the passage within which it rotates.

* * * * *